Oct. 7, 1924.
S. W. SELF
1,510,965
MILK BOTTLE CARRIER
Filed April 21, 1923
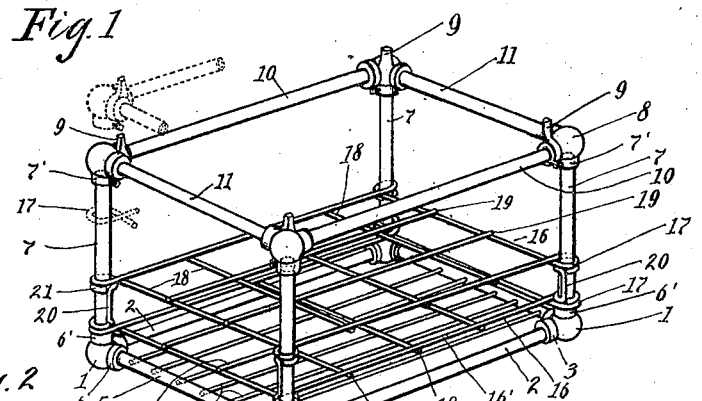
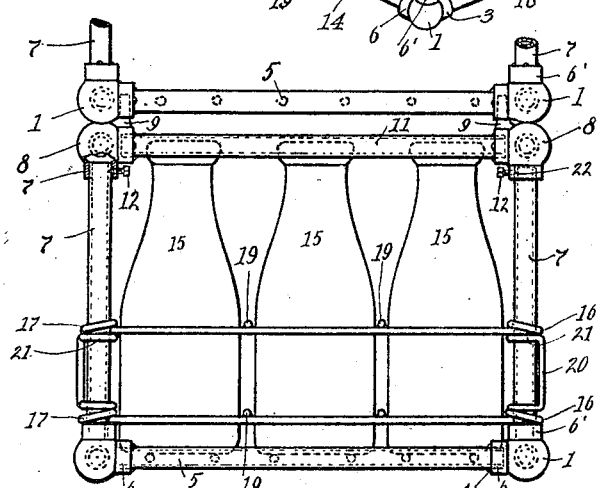
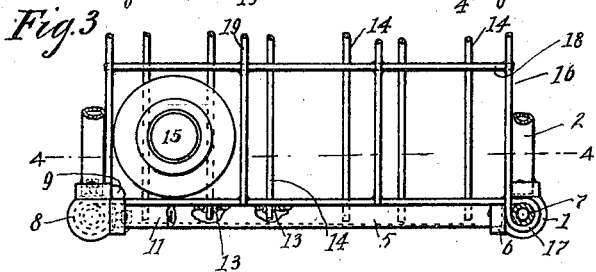
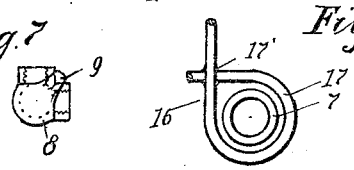
Inventor
Sydney W. Self
By H. S. Johnson
Attorney Patented Oct. 7, 1924.

1,510,965

UNITED STATES PATENT OFFICE.

SYDNEY W. SELF, OF ST. PAUL, MINNESOTA.

MILK-BOTTLE CARRIER.

Application filed April 21, 1923. Serial No. 633,683.

*To all whom it may concern:*

Be it known that I, SYDNEY W. SELF, a subject of the King of Great Britain, residing at St. Paul, in the county of Ramsey and State of Minnesota, have invented certain new and useful Improvements in Milk-Bottle Carriers, of which the following is a specification.

This invention relates to devices for carrying bottles which are arranged in parallel, uniformly spaced, similar rows, and more particularly to receptacles designed to hold a group of glass food containers, the contents of which requires periodical inspection to ascertain its condition, in conformity to prevailing food laws of the community.

An object of the invention is the provision of improved means for carrying about a group of milk bottles, constructed to enable the milk to be conveniently and efficiently inspected from all sides without disturbing the bottles; which may be constructed entirely of metal for sanitary purposes; and which embodies certain constructive features whereby the actual bottle supporting members of the device, may, upon distortion by excessive use, be easily and quickly replaced at small expense, and wherein parts of said bottle supporting members are duplicates, to further reduce the cost of manufacture of the device.

A further object of the invention is the provision of a device of the class described, adapted to take the place of an ordinary milk bottle box customarily made of wood, and which has compartments for keeping the bottles in spaced relation and from engaging with one another, and is usually provided with a pair of hand holes at opposite ends whereby the box may be conveniently carried. Some of these boxes are formed with metallic corners and reinforcing strips in the endeavor to extend the life of the box. As these boxes are subjected to severe handling in the creameries and by the truck men in the process of transportation, and as the weight of twelve quarts of milk is a considerable load for a wooden box to endure when carried by the hand holes or subjected to twisting strains, it will be apparent that the upkeep of the milk handling departments in creameries, due to the cost of renewing the milk boxes, is enormous.
An object of the present invention is to provide a metallic skeleton main frame portion to take the place of the ordinary box proper, made preferably of tubing to render it strong but light in weight, and which may be quickly partially disassembled, the tubular structure affording a smooth, rounded gripping surface for the hand at all parts of the frame, as distinguished from a sharp cornered wooden structure.

A further object of the invention is to provide a novel auxiliary structure adapted to be added to the main structure when the latter is partially disassembled, for directly sustaining the milk bottles, said auxiliary structure including novel features of design whereby it is securely supported on the main structure, and may be manufactured at a relatively low cost, so that when distorted and broken and unfit for use it alone need be replaced, thus effecting a great saving in repair expense.

Other objects and advantages will be pointed out as this specification progresses, the invention consisting in the construction, combination, and arrangement of parts, hereinafter described and claimed.

In the drawings:

Figure 1, is a perspective view of a carrying device embodying my invention.

Figure 2, is an end view of same.

Figure 3, is a top view of one end of same, shown partly in section.

Figure 4, is a fragmentary sectional view on line 4—4 of Figure 3.

Figures 5, 6, and 7 are views of details.

The main structure of my invention, as here shown, comprises four three-way right angled corner pipe fittings 1, joined together by relatively long tubular side members 2, which latter extend, respectively, at opposite ends into sockets 3 of the fittings, and are preferably firmly spot welded to the latter as at 4. End pipe members 5 are similarly secured in sockets 6 of said fittings, to thus form a rectangular frame having at each corner an upwardly facing pipe socket 6', all of the upturned sockets being axially disposed in parallelism at right angles to the frame.

Fitting into and welded respectively to the sockets 6', are uprights or corner pipe members 7. The uprights are of uniform length and have at their upper extremities slidable engagement respectively with sockets 7' of three-branch pipe fittings 8, said fittings being substantially similar to the fittings 1, described in the foregoing, with the exception that each is provided with a preferably integral vertically extending lug 9, for a purpose hereinafter explained.

The corner fittings 8 are firmly joined together by side and end pipe members 10 and 11, respectively, and preferably in substantially the same manner as are the side and end members 2 and 5 to the fittings 1. Screw threaded in and extending one through the side of each of the sockets 7' of the corner members 8, are the set screws 12, adapted to engage with the uprights to thereby firmly removably secure the frame formed by the fittings 8 and the side and end members 10 and 11.

The inner wall of each of the end members 5 (Figures 3 and 4) is perforated by an alined row of openings 13, adapted to receive supporting rods 14, which support the bottles 15, said rods extending at their free ends an appreciable distance into said end members to be firmly anchored therein. The supporting rods are suitably spaced to bring two of same under each bottle to support the latter in upright position, the bottles being preferably arranged in lateral and longitudinal rows.

The rods are preferably spot welded at their ends to the end members 5, as shown in Figure 3.

Removably supported on the main structure, is a composite auxiliary structure, composed, as here shown, of a pair of duplicate open work rectangular frames, designated generally by the number 16. These frames are formed preferably of a continuous wire 16', bent to form eyes 17, which latter loosely receive, respectively, the corner posts 7 of the main structure, as indicated in Figure 6 of the drawing. The eyes, as here shown, are bodily outside of the sides and ends of the frame, the latter being preferably spot welded as at 17' to lend stability to the frame.

The frame is further formed with transverse members 18, three being shown, and longitudinal members 19 of which two are shown, the members collectively forming twelve rectangular open bottle receiving square openings or meshes, adapted to loosely receive an ordinary milk bottle. At their points of intersection, the rods 18 and 19 and the main surrounding wire 16' are preferably spot welded together to form a unitary open work frame. Thus, when the top frame of the main structure is removed, as described in the foregoing, a plurality of the open work frames may be inserted over the corner members 7, the mesh of the several frames thus alining vertically to hold the bottles in upright position, as well as in spaced relation.

For the purpose of holding the frames separated, a separator member 20 is provided. This member may consist of a piece of ordinary tubing of sufficient inner diameter to loosely telescope over the corner pipe members 7, as shown in Figure 4, but is preferably made of wire, as shown in Figure 5. The separator is formed with a pair of vertically alined horizontally disposed rings 21, which loosely surround and slide over the corner posts of the main structure, the distance between the rings being such as to hold the upper frame 16 at a level approximately coincident with the point of juncture of the uniform diameter portion of the milk bottle, with the curved and gradually reducing top thereof. The main structure is constructed to bring the side and end rails of the removable top frame an appreciable distance above the top of the bottles, so that any objects accidentally laid across the top of the rails may not contact with the tops of the bottles.

The eyes 17 of the lower open work bottle supporting frame are adapted to be seated on the sockets 6' of the fittings 1 of the main structure, whereby the frame is held in spaced relation to the end and side members 2 and 5, so that the bottom of the bottles are visible at all times through the side of the carried device, to be enabled to detect sediment forming in the milk without removing the bottles from the holder. As these bottle carrying devices or holders must be capable of being economically stacked, with respect to space, one upon another to great heights, it is important that effective means be provided to keep the holders from shifting laterally upon one another when so stacked. For this purpose, the lug 9, hereinbefore mentioned, is provided, it being here shown as extending upwardly in a manner to engage the inner angle formed by the sockets 3 and 6 of the fittings 1 of the holder above, as is clearly shown in Figure 2 of the drawings. The body of the fittings as here shown is globular in form after the manner of ordinary pipe fittings, but it is to be understood that any other method of connecting the side and end rail members of the main structure with the posts 7 may be resorted to without departing from the spirit of the invention.

In operation, the bottles are positioned as indicated in Figures 2 and 4, wherein they are shown supported on the rods 14, and held in spaced relation by the members 18 and 19, it being understood that the top frame of the main structure is firmly secured to the uprights or corner posts 7 by means of the set screws 12. Incidentally, the corner posts may be provided with a notch, as indicated by dotted lines at 22 (Figure 2) to receive the ends of the set screws to effect a firmer connection. When the frames 16 become distorted or bent beyond repair, through hard usage, or the spot welded joints become broken, the top frame of the structure may be readily removed, as hereinbefore explained, and the bottle supporting frames may then be slid vertically off the corner posts and be conveniently replaced by new ones. This is a great advantage in devices of this kind, inasmuch as the main structure need not be renewed. Further, a great advantage is had by having the auxiliary structure, constituted in the two frames 16 and the spreader or separating members 20, formed of duplicate parts, as are the frames and the spreaders, thus simplifying the manufacturing of the same in that fewer tools are required such as dies and the like.

It is also obvious, that my improved bottle carrying device affords sanitary advantages in that it may be sterilized by being placed in a sterilizing tank without injury to any of the parts, which is not possible in wooden structures because of the swelling of the wood and consequent loosening of the nails and the like.

A further and very important advantage of the construction disclosed, resides in facilitating the handling of the device when delivering from trucks, in that it may be gripped at any part of the frame without injury to the hand, and in that it may be safely stacked to greater heights than wooden boxes, and in that it discloses the entire contents of all of the holders, as distinguished from many of the present boxes in use.

It is to be understood that my improved milk bottle carrier may be made of a unitary metallic main frame formed of relatively heavy bars defining the corners of a rectangular parallelepiped prism, and an auxiliary wire structure adapted to be supported on the main frame to hold milk bottles in spaced upright relation, the auxiliary structure being formed of relatively thin, light weight metal bars, which may be easily removed from the main structure and renewed.

I claim:

1. A bottle carrying device, comprising a frame made up of a skeleton base and top, corner uprights detachably connecting said base and top, and a bottle spacing rack interlockingly engaging said uprights and removable therefrom upon the disconnection of said uprights and frame.

2. A bottle carrying device, comprising a demountable skeleton frame work, a plurality of mutually interchangeable bottle spacing racks connected thereto and removable therefrom by demounting the skeleton frame work, and removable means slidably connected to the skeleton frame work to separate the spacing racks and thus support the bottles at different points throughout their height.

3. In a milk bottle carrying device of the class described, the combination with a structure comprising a rectangular frame forming the base thereof, uprights of uniform length secured respectively to the corners of said frame, and a second frame removably attached to the top of said uprights, said base frame having an open work bottom adapted to sustain a plurality of milk bottles in upright position; of a metallic structure constructed to surround each of the milk bottles individually, and all of said bottles collectively, to sustain the latter in upright position, said structure being formed to interlockingly engage with said uprights to be removably held in operative position on said structure.

In testimony whereof I affix my signature.

SYDNEY W. SELF.